United States Patent [19]

Cannaday

[11] Patent Number: 4,989,546
[45] Date of Patent: Feb. 5, 1991

[54] PET REFUGE

[76] Inventor: Ted Cannaday, 1010 Middle St., Sullivan's Island, S.C. 29482

[21] Appl. No.: 383,600

[22] Filed: Jul. 24, 1989

[51] Int. Cl.⁵ .............................................. A01K 1/03
[52] U.S. Cl. ...................................................... 119/19
[58] Field of Search ................................ 119/1, 15, 19

[56] References Cited

U.S. PATENT DOCUMENTS

| | | |
|---|---|---|
| 1,460,945 | 7/1923 | Chaplin . |
| 2,495,830 | 1/1950 | Wagner ................................ 189/69 |
| 2,717,036 | 9/1955 | Harris ................................. 160/354 |
| 2,748,854 | 6/1956 | Lynch ................................... 119/19 |
| 2,877,840 | 3/1959 | Hurowitz et al. .................... 160/91 |
| 2,932,279 | 4/1960 | Giles ..................................... 119/19 |
| 3,690,299 | 9/1972 | Johnson ........................... 119/19 X |
| 3,738,322 | 6/1973 | Smith ................................... 119/15 |
| 3,797,554 | 3/1974 | Johnson .............................. 160/354 |
| 4,021,975 | 5/1977 | Calkins ............................ 119/19 X |
| 4,022,263 | 5/1977 | Beckett et al. .................... 119/19 X |
| 4,224,899 | 9/1980 | Cruchelow et al. ................. 119/19 |
| 4,291,645 | 9/1981 | Cruchelow et al. ................. 119/19 |
| 4,445,459 | 5/1984 | Julie ................................ 119/19 X |
| 4,696,259 | 9/1987 | Fewox ................................... 119/19 |
| 4,788,934 | 12/1988 | Fetter ............................. 119/19 X |
| 4,844,016 | 7/1989 | Filosa .................................. 119/19 |

Primary Examiner—Gene Mancene
Assistant Examiner—R. Thomas Price
Attorney, Agent, or Firm—Foley & Lardner, Schwartz, Jeffery, Schwaab, Mack, Blumenthal & Evans

[57] ABSTRACT

A pet refuge is disclosed which may be installed in a window opening. The pet refuge includes a projecting enclosure which extends into the outdoors and which is partially constructed of screening material to form a protected pet dwelling space. This allows a pet animal to enjoy the sights, sounds and smells of the out of doors. In a region adjacent the window opening, the projecting enclosure has a closed threshold wall which seals the protected pet dwelling space with respect to the indoors. The closed threshold wall includes a door which is openable at will by the pet to permit the pet to pass between the indoors and the protected pet dwelling space within the screened enclosure. Thus, the indoor area is sealed with respect to the outdoor area so as to prevent loss of heat or air conditioning from the indoor area while preventing entry of outside elements, such as wind, rain, drafts, dust, or the like, into the indoor area.

8 Claims, 6 Drawing Sheets

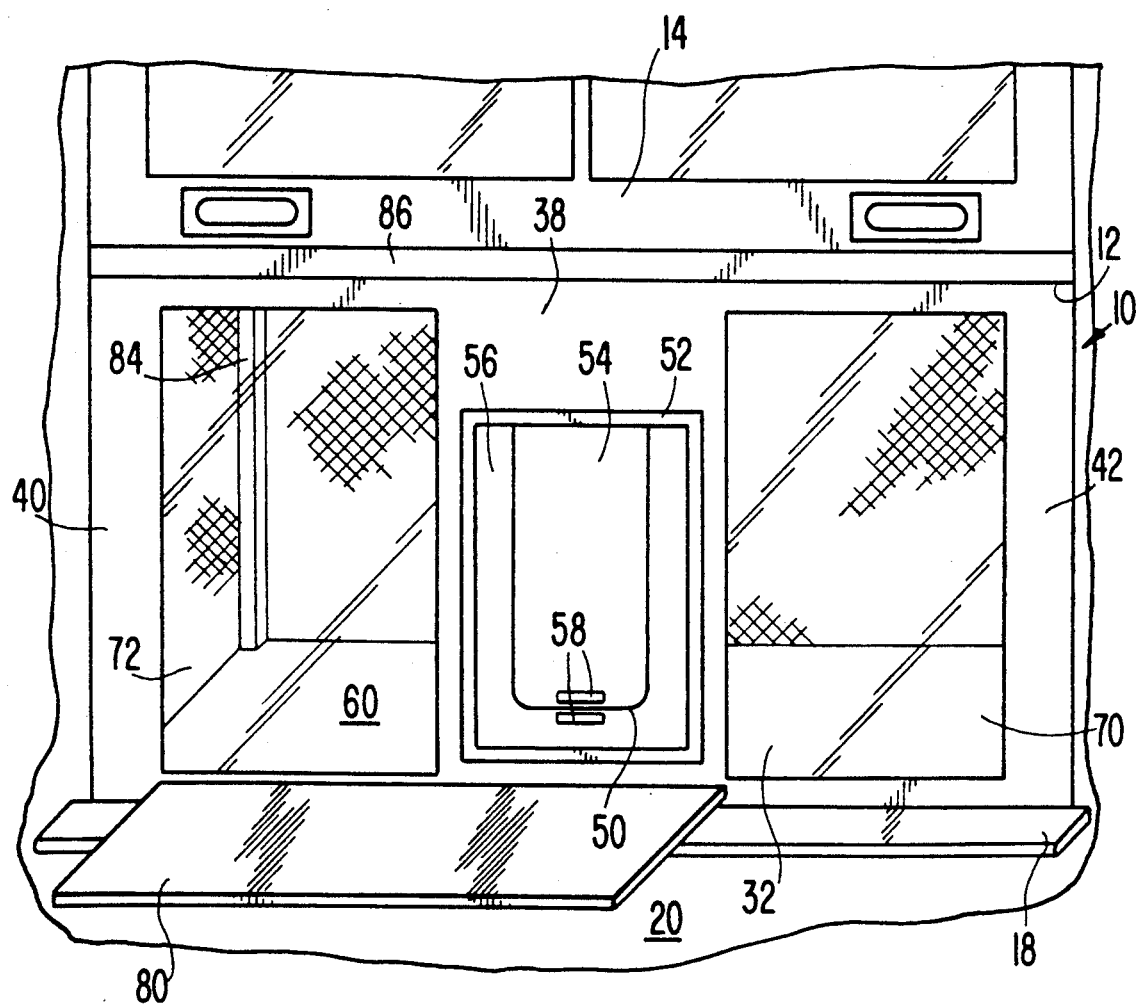

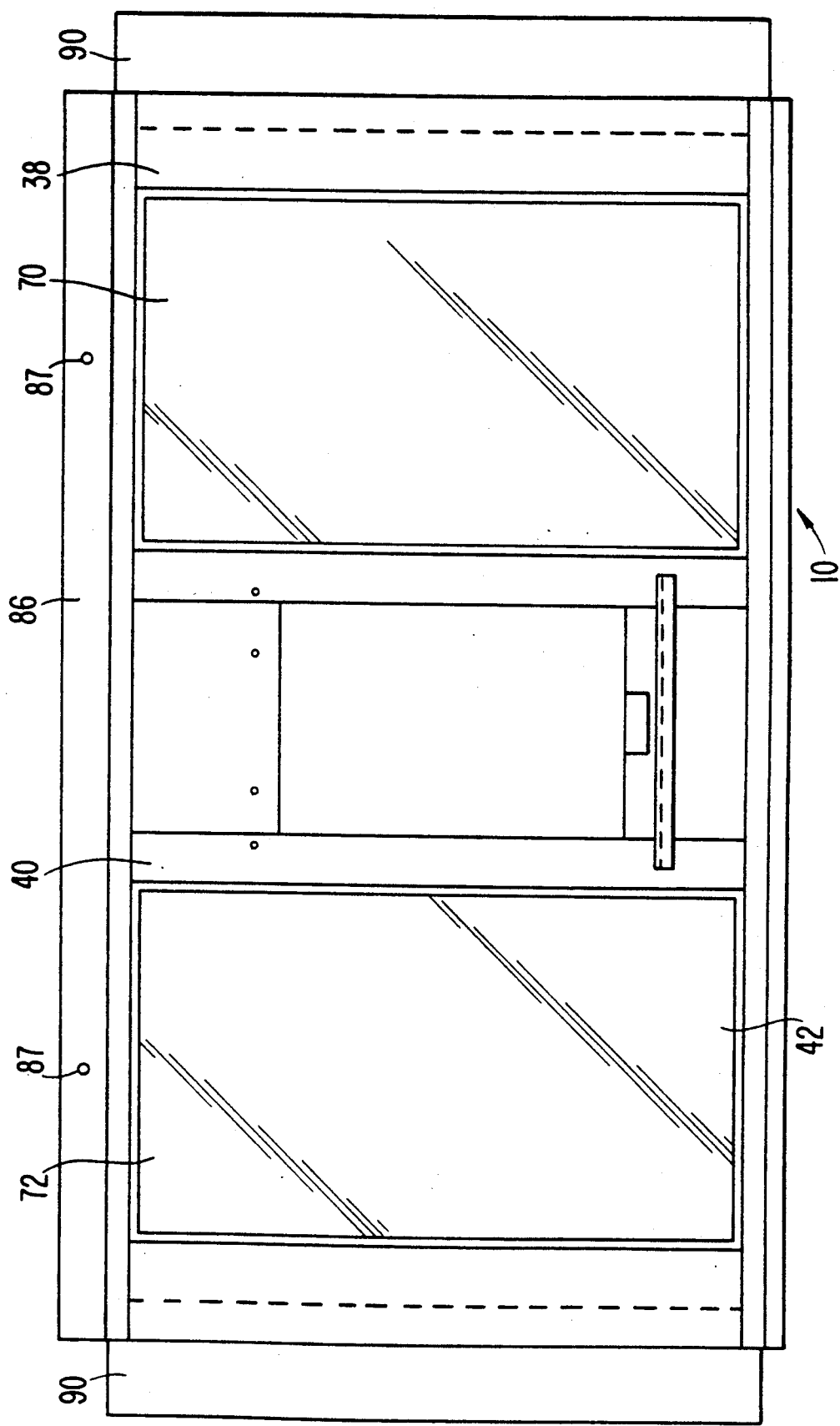

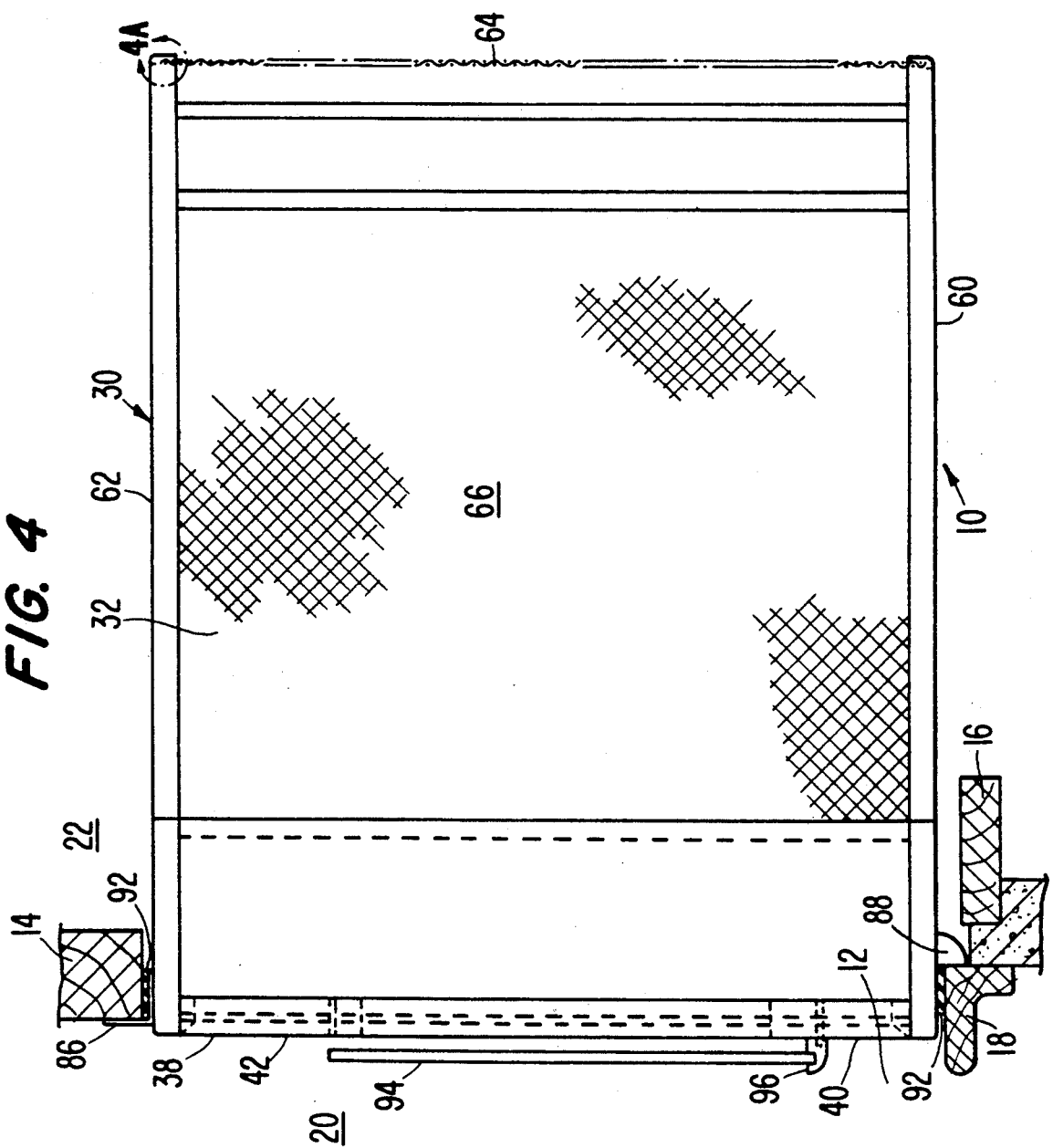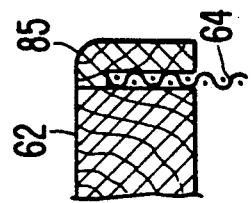

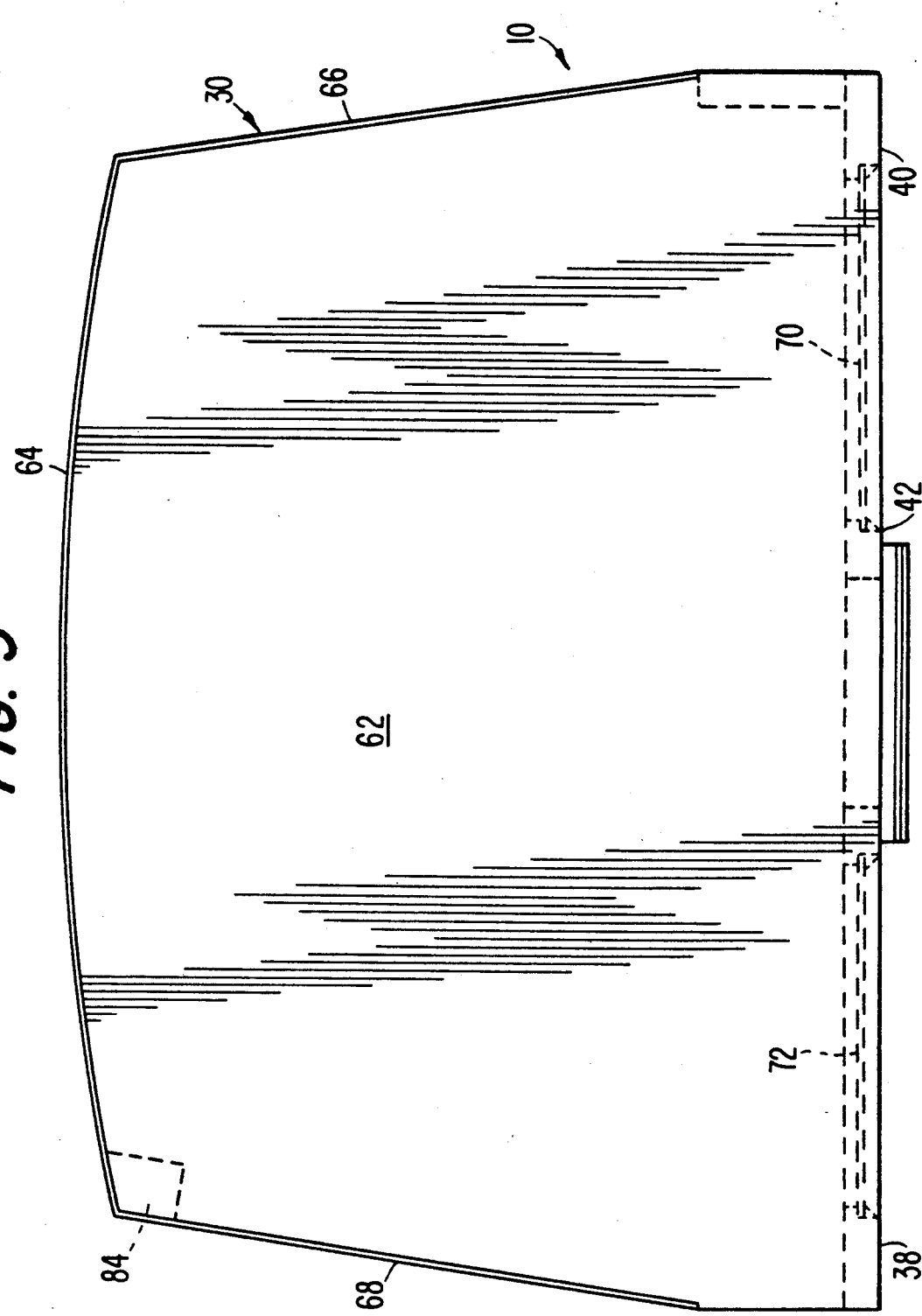

PET REFUGE

BACKGROUND OF THE INVENTION

1. Field of the Invention

The present invention relates to the field of devices which may be mounted in or adjacent to a window so that a pet animal such as a dog or cat may secure access thereto from inside the building.

2. Discussion of the Prior Art

Window mounted enclosures for animal pets have been proposed before, although none is known to have been commercially successful.

U.S. Pat. No. 1,460,945 discloses a window dog kennel for mounting on the outer part of a window sill. To gain access to the kennel, the window sash must be raised and lowered by the pet owner or keeper if the building is to be sealed against the outside weather.

U.S. Pat. No. 4,445,459 shows a portable window mounted enclosure for animal pets. Again, the device disclosed does not permit sealing of the building with respect to the enclosure while at the same time giving the pet to access the enclosure at will.

SUMMARY OF THE INVENTION

It is an object of the present invention to overcome the drawbacks of the prior art in a simple and economical manner.

It is a further object of the present invention to provide an animal refuge which may fit in a window opening or the like, which may be readily accessed by an indoor pet animal without any human intervention and which, at the same time, provides for continuous sealing of the indoor area with respect to the outdoor area so as to prevent loss of heat or air conditioning from the indoor area, while preventing entry of outside elements such as wind, rain, drafts, dust, leaves or the like into the indoor area.

It is a further object of the present invention to provide a pet refuge in which an indoor pet animal may partake of enjoyment of the out-of-doors while being protected from the dangers thereof, while maintaining a seal between the animal's indoor area and the outside, and while also permitting viewing of the pet from indoors while the pet is in the protected outdoor space.

It is a further object of the present invention to provide a pet refuge having the foregoing advantages and in which the seal between the indoors and outdoors is particularly effective and complete.

It is yet another object of the present invention to provide a pet refuge having the foregoing advantages and in which the pet owner or keeper may still control access of the pet to and from the protected outdoor space.

It is yet another object of the present invention to provide a pet refuge having the foregoing advantages and in which the pet refuge still allows light to pass from the outside to the inside through the area of a window opening where the pet refuge is located.

These and other objects and advantages will be apparent from the detailed description which follows and from the drawings.

To achieve the foregoing objects and advantages, as well as others, the present invention provides for a pet refuge for installation in a window opening between an interior space and an outside area. The pet refuge includes a projecting enclosure which projects into the outside area beyond the window opening.

The projecting enclosure is at least partially perforate, such as by the use of screening, so as to freely admit outside air into the enclosure and so as to provide the pet in the enclosure with access to outdoor sights, smells and sounds. The projecting enclosure defines therewithin a pet dwelling space.

The side of the projecting enclosure nearest the indoor area represents a threshold area, which threshold area is a boundary of the pet dwelling space. The pet will cross this boundary to enter the pet dwelling space. A closed threshold wall extends across the threshold area and seals the pet dwelling space with respect to the interior space of the building, i.e. the space disposed inside the window opening. Thus, outside air admitted into the pet dwelling space is not admitted into the interior space. Accordingly, the closed threshold wall acts as a closed barrier between the interior space and the outside area.

A door is disposed in the threshold wall, the door being openable to permit the pet animal to pass between the interior space and the pet dwelling space. The door is also closable to maintain the seal between the pet dwelling space and the interior space.

The projecting enclosure includes a set of enclosure walls, among which are a closed bottom wall, which serves as a floor for the pet dwelling space, and a closed top enclosure wall, which serves as a roof for the pet dwelling space. Screening extends between the top and bottom walls to open the projecting enclosure to outdoor air.

The closed threshold wall is at least partially transparent, and the transparency may be achieved by the use of a pair of pet windows. The pet windows surround the door to the pet dwelling space, such that the door is disposed between the two pet windows.

The pet refuge may also include a platform coupled with the threshold wall and disposed adjacent the door. This platform extends generally horizontally from the threshold wall into the interior space. The platform may serve as a landing for the pet to enter through or exit from the door.

BRIEF DESCRIPTION OF THE DRAWINGS

FIG. 2 is another perspective view of the pet refuge of FIG. 1 but from an indoor vantage point. FIG. 2 shows a platform which may serve as a landing for the pet to enter and exit the pet dwelling space through a door in the threshold wall of the pet refuge.

FIG. 3 is an elevational view of the pet refuge of the present invention from the side on which the threshold wall is located. In FIG. 3, the access door has been removed.

FIG. 4 is a side elevation of the pet refuge of the present invention in which the access door has been removed but in which a door cover for the access door is illustrated.

FIG. 4a is a fragmentary, enlarged, detailed, elevational view showing the attachment of the screening to the top enclosure wall.

FIG. 5 is a plan view of the pet refuge of the present invention.

DETAILED DESCRIPTION OF THE PREFERRED EMBODIMENT

Figure 1:
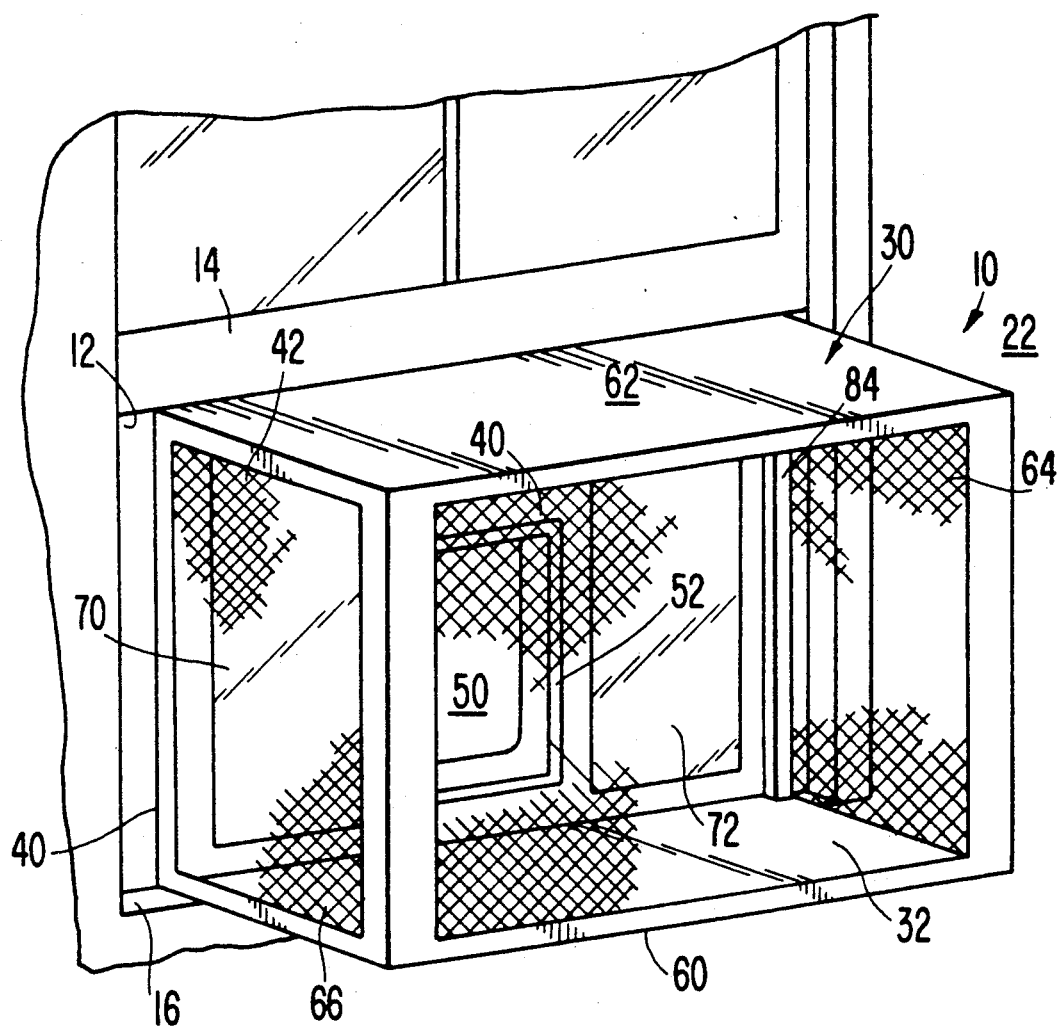
FIG. 1 is a perspective view of a pet refuge according to the present invention, which pet refuge is installed in a window opening, the pet refuge being viewed from an outdoor vantage point.

In the following description, and in the drawings, like reference characters used among the various figures of the drawings refer to like elements or features.

Reference character 10 generally refers to a pet refuge according to an exemplary embodiment of the present invention. Pet refuge 10 is intended for placement in a window opening 12, as best seen in FIGS. 1, 2 and 4. As shown, window opening 12 is formed by raising a window sash 14 so as to define an opening 12 between the sash 14 and window ledge 16 from an outdoor perspective, or between the window sash 14 and window sill 18, from an indoor perspective.

The indoor environment is referred to herein and designated as interior space 20. The outdoor environment is referred to herein and designated as outside area 22. While the most common application for the present invention will be use in a window of a building used as a dwelling, such as a house or apartment, it will be understood that other applications are possible as well. For example, the present invention could be used in connection with motor vehicles or boats.

Pet refuge 10 includes a projecting enclosure 30 which projects and extends outwardly into outside area 22 beyond window opening 12 in the manner of a window air conditioner unit. As will be readily seen from the drawing, projecting enclosure 30 is partially perforate, i.e. a substantial portion of the enclosure 30 is constructed of screening so as to freely admit outside air into the enclosure and so as to allow a pet in the enclosure to view the outside area. It will be apparent that the projecting enclosure 30 defines therewithin a pet dwelling space 32. The partially perforated nature of projecting enclosure 30 allows the pet, such as a cat, to enjoy the outside air, smells, and sunshine. It also allows the pet to directly view the outside and to directly hear the outdoor sounds. Thus indoor pets may experience the out-of-doors without the attendant dangers.

Projecting enclosure 30 has a base side 38, which is the side which will be nearest the indoors. Base side 38 defines a threshold area 40. Threshold area 40 constitutes a boundary of pet dwelling space 32, across which boundary the pet will cross to enter pet dwelling space 32.

A closed threshold wall 42 extends across threshold area 40 and seals pet dwelling space 32 with respect to interior space 20 disposed inside window opening 12. That is, threshold wall 42 represents a seal between the indoor and outdoors. Thus, outside air admitted into pet dwelling space 32 is not admitted into interior space 20, and enclosed threshold wall 42 acts as a closed barrier between interior space 20 and outside area 22.

A door 50 is disposed in threshold wall 40. Door 50 is openable at will by the pet to permit the pet to pass between interior space 20 and pet dwelling space 32. Of course, door 50 is also closable to maintain the seal between pet dwelling space 32 and interior space 20.

Doors which may be operated by pets to enter and exit a building are well known in the art, and any suitable door of this nature may be used. A door of the type shown in U.S. Pat. No. 2,758,646, which patent is hereby incorporated herein by reference, is particularly suitable.

The door 50 includes a frame 52 with an inner flap 54. Surrounding and overlying inner-flap 54 are outer U-shaped flaps or borders 56, one such outer-flap 56 being disposed on each side of inner-flap 54. To enter the pet dwelling space 32, an animal pushes against inner-flap 54, moving with it the outer U-shaped flap 56 on the opposite side of the door, i.e. the side adjacent pet dwelling space 32. Conversely, if the pet is passing through the door from pet dwelling space 32 into interior space 20 in the building or the like, the pet pushes against inner-flap 54 and outer U-shaped flap 56 facing interior space 20 will move along with it. Such an arrangement provides for a particularly effective seal and aids in keeping out the elements such as drafts and rain. Magnets 58 on flaps 54, 56 may be used to further enhance the sealing performance of door 50 and to ensure that flaps 54, 56 will be maintained in their closed position when the door 50 is not being used by the pet.

It will be apparent that the arrangement of the present invention, with the use of the closed threshold wall 42 and door 50, will seal the indoor space, i.e. interior space 20, against the weather outside. Thus, heat or air conditioning within interior space 20 is maintained, and drafts are avoided. At the same time the door 50 is swingably movable by the pet to open the door and allow the pet to move between the interior space 20 and the pet dwelling space 32, the flaps being biased to be self-closing after being opened by the pet.

Projecting enclosure 30 includes a plurality of enclosure walls, one of which is a closed bottom enclosure wall 60 which serves as a floor for pet dwelling space 32. Another of the walls forming pet dwelling space 32 is a closed top enclosure wall 62 which serves as a roof for pet dwelling space 32.

The remaining walls forming pet dwelling space 32, with the exception of aforementioned closed threshold wall 42, are walls of open mesh material such as screening, which open mesh walls extend between the bottom and top enclosure walls, 60, 62 to render projecting enclosure 30 partially perforate so as to freely admit outside air into pet dwelling space 32.

These open walls include a front enclosure wall 64 and two side enclosure walls 66, 68, all of which walls 64, 66, 68 extend between bottom and top enclosure walls 60, 62. As indicated, the front enclosure wall 64 and the side enclosure walls 66, 68 are constructed of open mesh screening.

It will be seen that the closed threshold wall 42 between the pet dwelling space 32 and interior space 20 is partially transparent. In particular, threshold wall 42 includes a pair of pet windows 70, 72 which are preferably constructed of ⅛ inch plexiglas. Pet windows 70, 72 are suitably sealed with respect to the remainder of threshold wall 42, which may be constructed of wood (as may also be the case with enclosed bottom enclosure wall 60 enclosed top enclosure wall 62 of pet dwelling space 32.)

Door 50 is preferably centered in threshold wall 42. Transparent pet windows 70, 72 are preferably disposed on either side of door 50, so that door 50 is disposed between pet windows 70, 72. It will be apparent that pet windows 70, 72 allow the pet to be seen from interior space 20 and also allow the pet to see into interior space 20. Further, pet windows 70, 72 allow light from the outside to enter interior space 20.

Pet refuge 10 may include a platform 80 (shown only in FIG. 2) which may be detachably coupled by any suitable means to threshold wall 42 and disposed adjacent door 50. Platform 80 extends generally horizontally from threshold wall 42 into interior space 20. Platform 80 acts as a landing for the pet to enter through or exit from door 50 when passing between pet dwelling space 32 and interior space 20. Thus, platform 80 allows the pet easy access to the pet refuge 10 if window sill 18 is not wide enough for this purpose or if there is no other object, such as furniture, near the pet refuge 10.

To provide a sturdy construction, pet dwelling space 32 may include upright posts 84 extending between bottom enclosure wall 60 and top enclosure wall 62. Walls 64, 66 and 68, which are constructed of screening, as described, may be affixed to bottom and top enclosure walls 60, 62 by screen molding strips 85 as shown in FIG. 4A.

Preferably, projecting enclosure 30 takes the general form of a parallelepiped, although it is also preferred that the projecting enclosure 30 taper slightly from threshold wall 42 toward front enclosure wall 64 as best seen in FIG. 5. To provide a pleasing appearance, certain of the walls may also have a curved configuration, as best seen in connection with front enclosure wall 64 when viewed from the top as in FIG. 5.

Instead of using screening to form walls 64, 65, 66 and 68, these walls may be constructed of a solid transparent material, preferably transparent plastic such as sold under the trademark Plexiglass. A particularly advantageous arrangement is one in which the screening may be replaced in winter with transparent plastic panels to keep the enclosure warm and to protect the pet from harsh weather. It will be important, however, to ensure that the overall projecting enclosure 30 still remains partially perforate even after the transparent panels are installed. This will insure adequate ventilation of enclosure 30 and prevent excessive heat build-up upon direct exposure to the sun. To this end, one or more of the transparent panels may include openings therein. In addition or in the alternative, openings, even selectively openable and closable openings, may be provided in walls 60 and/or 62.

Figure 6:
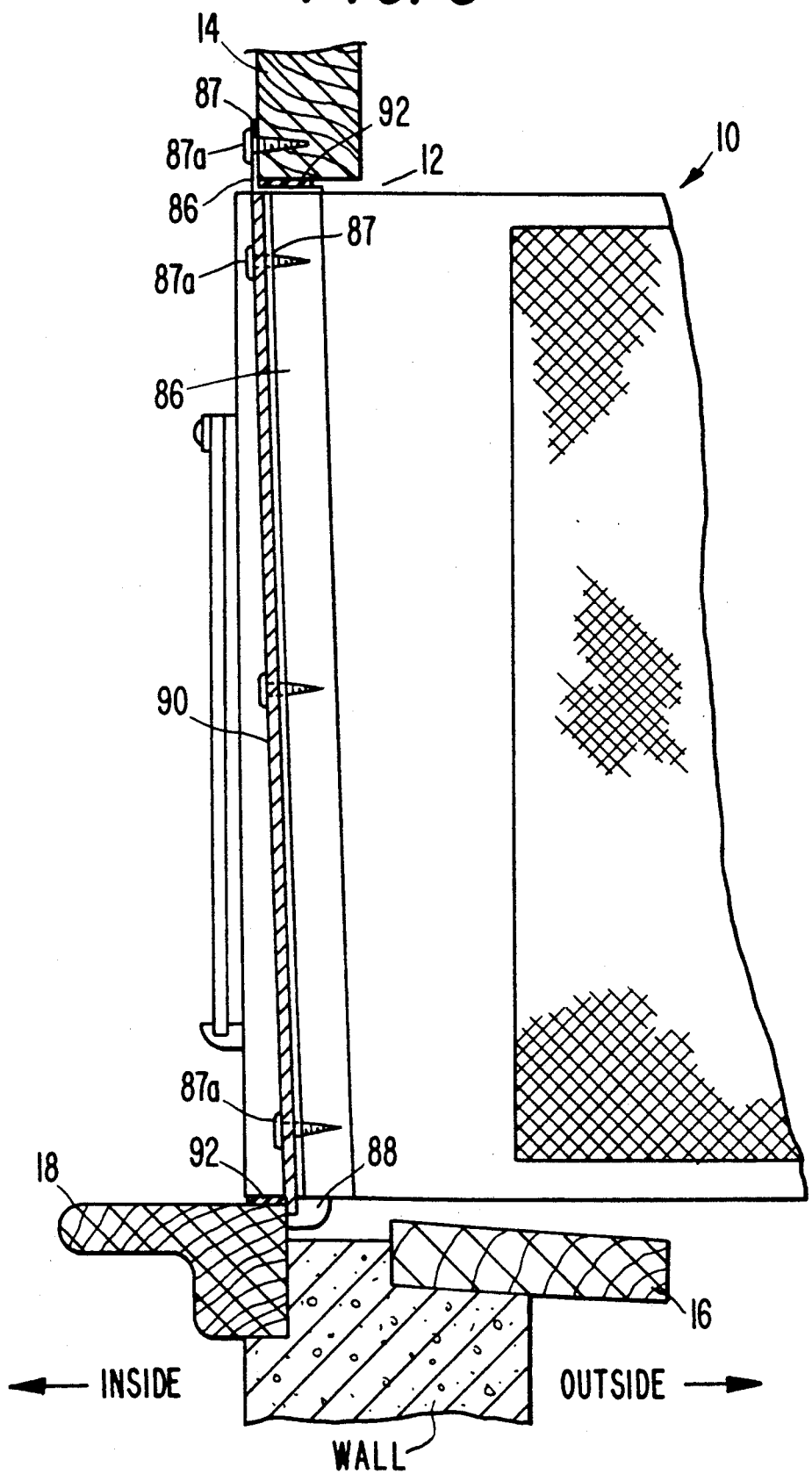
FIG. 6 is an enlarged, fragmentary, side elevational view, partly in section, showing the installation of the pet refuge of the present invention in a window opening.

As previously indicated, pet refuge 10 installs in an open window in a manner similar to a window air conditioner. To aid in the installation, threshold wall 42 may include L-shaped brackets 86, in the form of aluminum extrusions, to cooperate with the window sash 14, as best seen in FIGS. 4 and 6. Brackets 86 may include holes 87 therein (FIGS. 3 and 6) for securing the pet refuge 10 to the window sash 14 by screws 87a. Similarly, a bottom strip 88 may be provided adjacent threshold wall 42 to aid in securely seating pet refuge 10 with respect to the lower part of window opening 12, i.e. with respect to window ledge 16 and/or window sill 18.

To ensure that pet refuge 10 will fit a variety of window sizes, side panels 90 may be provided, as shown in FIG. 3. These may be cut to size by the user to completely fill the window opening 12 and may be attached to threshold wall 42 using screws and L-shaped brackets 86 (FIG. 6). Weatherstripping 92, as shown in FIGS. 4 and 6, may be used to seal pet refuge 10 with respect to window opening 12.

A cover 94, as shown in FIG. 4, may be provided for door 50. In FIG. 4, the door 50 is not in place and cover 94 is therefore shown in the approximate position it would be located when the door is attached. Cover 94 may be placed in a pair of slotted retainers 96, only one of which is shown in FIG. 4. When cover 94 is in place, door 50 is blocked. Thus the pet owner may ultimately control access to and from pet dwelling space 32 of pet refuge 10 by use of cover 94. Such a cover, itself, is known in the art as shown in aforementioned U.S. Pat. No. 2,758,646.

While the present invention has been described and illustrated in conjunction with a particular preferred embodiment, it will be appreciated that many variations and other embodiments are possible within the spirit and scope of the invention as defined in the appended claims.

What is claimed is:

1. A pet refuge for installation in a window opening, which window opening is between an interior space and an outside area, the pet refuge comprising:
    (a) a projecting enclosure projecting into the outside area beyond the window opening, said projecting enclosure being at least partially perforate so as to freely admit outside air into the enclosure and so as to allow a pet in the enclosure to view the outside area, said projecting enclosure partially defining a pet dwelling space therewith;
    (b) said projecting enclosure having a side defining a threshold area, said threshold area constituting a boundary of said pet dwelling space, across which boundary the pet will cross to enter the pet dwelling space;
    (c) a closed threshold wall which is at least partially transparent and which extends across said threshold area and seals said pet dwelling space with respect to the interior space disposed inside the window opening, so that outside air admitted into the pet dwelling space is not admitted into the interior space, whereby said closed threshold wall acts as a closed barrier between said interior space and said outside area;
    (d) a door in said threshold wall, said door being openable to permit the pet to pass freely between the interior space and the pet dwelling space, said door also being closable to maintain the seal between the pet dwelling space and the interior space.

2. A pet refuge as defined in claim 1, wherein said projecting enclosure includes a plurality of enclosure walls.

3. A pet refuge as defined in claim 2 wherein said walls include a closed bottom enclosure wall which serves as floor for the pet dwelling space and a closed top enclosure wall which serves as a roof for the pet dwelling space.

4. A pet refuge as defined in claim 3 wherein screening extends between said top and bottom walls to render said projecting enclosure partially perforate.

5. A pet refuge as defined in claim 3, wherein said projecting enclosure includes a front enclosure wall and two side enclosure walls extending between said bottom and top enclosure walls, said front enclosure wall and said side enclosure walls being constructed of screening to render said projecting enclosure partially perforate.

6. A pet refuge as defined in claim 1 wherein said door is centered in said closed threshold wall and wherein said closed threshold wall includes a pair of closed, transparent, pet windows on either side of said door so that said door is disposed between said pet windows.

7. A pet refuge as defined in claim 1 wherein said door constitutes a flap, which flap is swingably moveable by a pet to open the door and to allow the pet to move between the interior space and the pet dwelling space and which flap is biased to be self closing after it has been opened by the pet.

8. A pet refuge as defined in claim 1, further comprising a platform coupled with said threshold wall and disposed adjacent said door, said platform extending generally horizontally from said threshold wall into the interior space, whereby said platform may serve as landing for entry through or exit from the door.

* * * * *